United States Patent [19]

Stewart

[11] 4,299,744
[45] Nov. 10, 1981

[54] HIGH IMPACT POLYAMIDES

[75] Inventor: David E. Stewart, Bedford, N.H.

[73] Assignee: American Hoechst Corporation, Somerville, N.J.

[21] Appl. No.: 157,000

[22] Filed: Jun. 6, 1980

[51] Int. Cl.³ .................. C08L 77/00; C08L 77/08
[52] U.S. Cl. ...................... 260/23 AR; 260/18 N; 525/183
[58] Field of Search ............... 525/183; 260/23 AR, 260/18 N

[56] References Cited

U.S. PATENT DOCUMENTS

| | | | |
|---|---|---|---|
| 3,373,223 | 3/1968 | Armstrong | 525/183 |
| 3,373,224 | 3/1968 | Mesrobian | 525/183 |
| 3,388,186 | 6/1968 | Kray | 260/857 |
| 3,472,916 | 10/1969 | Anspon | 525/183 |
| 3,492,367 | 1/1970 | Starkweather | 525/183 |
| 3,516,961 | 6/1970 | Robb | 525/183 |
| 3,548,028 | 12/1970 | Itabashi | 525/183 |
| 3,673,277 | 6/1972 | Schmitt | 525/183 |
| 3,833,708 | 9/1974 | Miller | 525/221 |
| 3,993,611 | 11/1976 | Sims | 260/18 N |
| 4,018,731 | 4/1977 | Sims | 260/23.7 N |
| 4,018,733 | 4/1977 | Lopez | 525/183 |
| 4,035,438 | 7/1977 | Nielinger | 260/857 G |
| 4,100,223 | 7/1978 | Meyer | 525/184 |
| 4,105,709 | 8/1978 | Iwami et al. | 260/857 L |
| 4,167,505 | 9/1979 | Dunkelberger | 525/183 |
| 4,174,358 | 11/1979 | Epstein | 525/183 |
| 4,246,371 | 1/1981 | Meyer et al. | 525/183 |

FOREIGN PATENT DOCUMENTS

| | | |
|---|---|---|
| 2343693 | 3/1975 | Fed. Rep. of Germany. |
| 6705239 | 6/1967 | Netherlands. |
| 998439 | 7/1965 | United Kingdom. |

Primary Examiner—Paul Lieberman
Attorney, Agent, or Firm—Stephan P. Williams

[57] ABSTRACT

A high impact polyamide composition is disclosed which comprises at least 50% of a polyamide resin having a relative viscosity of at least 4.0, 5 to 30% of an olefin-acid copolymer, ionomers thereof, or mixtures of these, and 5 to 30% of a stabilizing polyamide resin which contains at least one long chain amide-forming monomer component.

22 Claims, No Drawings

HIGH IMPACT POLYAMIDES

BACKGROUND OF THE INVENTION

The present invention relates to polyamide compositions having exceptionally high impact strengths.

Although the polyamides in general use today such as nylon 6, nylon 6,6 and the various nylon copolymers are desirable for most applications, there are many specialty applications such as automotive and machinery parts which require exceptional strength and toughness.

Various attempts have been made in the proper art to increase the impact strength of polyamides. A common technique involves the formation of polyamide compositions containing olefin/carboxylic acid copolymers or ionomers (olefin/acid copolymers wherein a portion of the acid groups are neutralized with metal ions). Examples of such compositions may be found in U.S. Pat. No. 3,388,186, U.S. Pat. No. 3,472,916, G.B. Pat. No. 998,439, and Netherlands Pat. No. 6,705,239. Compositions of nylon/polyethylene/olefin-acid copolymer are disclosed in U.S. Pat. No. 3,373,223, U.S. Pat. No. 3,373,224 and U.S. Pat. No. 4,035,438. Another technique for improving impact strength involves the interpolymerization of a polyamide forming monomer with an amide-forming diolefin polymer and a dimerized fat acid or acid derivative. This technique is shown in U.S. Pat. No. 4,018,731. U.S. Pat. No. 3,993,611 discloses polyamide copolymers containing up to 15% long chain amide-forming monomers, but does not indicate any improvement in impact strength with such compositions.

While the various prior art techniques have been somewhat effective in improving the impact strength of polyamide resins, there still exists a need for polyamides having exceptional strength. Accordingly, it is an object of this invention to provide polyamide compositions having exceptional impact strength.

SUMMARY OF THE INVENTION

According to this invention a high impact polyamide composition is provided which comprises at least 50% of a polyamide resin having a relative viscosity of at least 4.0, 5 to 30% of an olefin-acid copolymer, ionomers thereof, or mixtures of these, and 5 to 30% of a stabilizing polyamide resin which contains at least one long chain amide-forming monomer component.

DESCRIPTION OF THE INVENTION

The high impact polyamide composition provided by the present invention comprises:

(a) at least 50% of a polyamide resin having a relative viscosity of at least 4.0 measured as a 1% solution in sulfuric acid at 25° C.

(b) 5 to 30% of an impact modifier selected from the group consisting of:

(i) an olefin-acid copolymer comprising at least 50 mole percent based on the copolymer of an α-alkene having 2 to 10 carbon atoms, or mixtures of such α-alkenes, and 0.2 to 25 mole percent based on the copolymer of an α,β-ethylenically unsaturated carboxylic acid having 3 to 8 carbon atoms, mixtures of such acids, or the salts, esters or anhydrides thereof;

(ii) ionomers of the olefin-acid copolymers defined in (i) wherein at least 10% of the carboxylic acid groups are neutralized with metal ions; and (iii) mixtures of (i) and (ii); and (c) 5 to 30% of a stabilizing polyamide resin which contains at least one long chain amide-forming monomer component having at least 9 atoms separating the amide-forming sites of said monomer.

Polyamide resins contemplated for use as component (a) of the present composition may be any of the known polyamide resins commonly designated as nylons. These resins are well-known in the art and are generally derived from dicarboxylic acids and diamines, including the dimeric fatty acids and amines, monoamino-monocarboxylic acids including the amino acids, or their cyclic lactams, and mixtures of these. Preferred polyamides include polyhexamethylene adipamide (nylon 6, 6), polyhexamethylene sebacamide (nylon 6,10), polycaprolactam (nylon 6), and copolymers or blends containing a major proportion of at least one of these. Most preferred is polycaprolactam.

In order to achieve the high impact strength provided by the present invention, the polyamide resin of component (a) should be a high molecular weight material having a relative viscosity of at least 4.0, preferably between 4.0 and 6.0, as measured according to ASTM D-789 (0.25 g in 25 ml sulfuric acid at 25° C.). These materials are readily available on the market and are prepared using conventional polymerization techniques simply by carrying out the polymerization to a higher degree. A particularly suitable high viscosity polyamide resin is sold under the trade name Fosta® Nylon 589 by American Hoechst Corporation. This resin has a relative viscosity between 4.7 and 5.5.

The high viscosity polyamide resin should comprise at least 50% of the composition of the present invention, preferably between 55 and 85%, and most preferably between 60 and 80% by weight.

Component (b) of the present composition is an impact modifier which may be selected from the group consisting of (i) olefin-acid copolymers, (ii) ionomers thereof and (iii) mixtures of these. These materials are well-known in the art and are exemplified in G.B. Pat. No. 998,439 and U.S. Pat. No. 3,264,272 which are incorporated herein by reference. Component (b) should comprise about 5 to 30%, preferably 10 to 20% by weight of the present composition. Advantageously, component (b) will comprise a mixture of olefin-acid copolymer and ionomer in a ratio of about 1:1 to 1:15, preferably about 1:2.

The olefin-acid copolymers contemplated for use in the present invention are copolymers of α-olefins with α,β-ethylenically unsaturated carboxylic acids. The α-olefin should be an α-alkene having from 2 to 10 carbon atoms or mixtures of such α-alkenes. Thus, suitable α-alkenes include ethylene, propylene, butene -1, pentene -1, etc. Ethylene is preferred. The α-olefin should comprise at least 50 mole percent of the olefin-acid copolymer, preferably about 70 to 96 mole percent.

The acid component of the olefin-acid copolymer is an α,β-ethylenically unsaturated carboxylic acid having 3 to 8 carbon atoms or mixtures of such acids. The esters, salts and anhydrides of such acids may also be employed. Suitable acids include acrylic, methacrylic, ethacrylic, itaconic, maleic and fumaric acids. Preferred are acrylic acid and methacrylic acid, and their lower alkyl esters, particularly ethyl acrylate and ethyl methacrylate. The acid component should comprise about 0.2 to 25 mole percent of the olefin-acid copolymer, preferably about 2 to 20 percent.

While other unsaturated monomers may be optionally copolymerized with the olefin and acid components to give other than a two-component copolymer, the two-component copolymers are preferred. Copolymers which may be advantageously employed are those derived from ethylene/acrylic acid, ethylene/methacrylic acid, ethylene/lower alkyl acrylates, and ethylene/lower alkyl methacrylates. Most preferred is the copolymer derived from ethylene/ethyl acrylate.

Ionomers of the above-described olefin-acid copolymers are also advantageously utilized in the present composition and are described in U.S. Pat. No. 3,264,272 and Netherlands Pat. No. 6,705,239. These ionomers result from the neutralization of a portion of the carboxylic acid groups in the olefin-acid copolymer with an ionizable metal compound. Suitable metal ions are the mono-, di- and trivalent ions of metals in Groups I, II, III, IV-A and VIII of the Periodic Table and include $Na^+$, $K^+$, $Ag^+$, $Cu^+$, $Mg^{+2}$, $Ca^{+2}$, $Ba^{+2}$, $Fe^{+2}$, $Zn^{+2}$, $Al^{+3}$, $Fe^{+3}$ etc. The preferred metals are the alkali metals, and sodium is most preferred. At least 10 percent of the carboxylic acid groups should be neutralized, preferably between 30 and 80%. Preferred ionomers which may be utilized are ethylene/methacrylic acid copolymers which have been partially neutralized with sodium or zinc ions. These are commercially available under the trade name SURLYN ®.

Component (c) of the present composition may be described as a stabilizing polyamide resin wherein at least one of the monomer components of said polyamide resin has at least nine atoms, generally carbon atoms, in the chain which separates the amide-forming sites of said monomer. The long chain amide-forming monomer component may be any of the conventional type of polyamide-forming monomers such as a dicarboxylic acid, diamine, amino-acid, or amide-forming derivative thereof, so long as said monomer component has at least nine atoms, and preferably nine to fifty atoms, separating the amide-forming sites.

Particularly suitable long chain polyamide-forming monomers are the amino-acids having at least nine carbon atoms, preferably 9 to 16 carbon atoms separating the amide-forming sites. Of these, 11-amino undecanoic acid and 12-amino dodecanoic acid are preferred.

While these long chain amino-acids may be utilized in the form of homopolymer such as nylon 11, nylon 12, etc. to form the stabilizing polyamide resin of component (c), it is preferred that said resin comprise a copolymer of the long chain amino-acid with other polyamide-forming monomers such as other amino-acids, lactams, and mixtures of diamines and dicarboxylic acids. Thus, copolymers of the long chain amino-acid with caprolactam (e.g. nylon 6,11) and with hexamethylene diamine/adipic acid (e.g. nylon 66, 11) may be advantageously employed. It is preferred that such copolymers contain about 5 to 20% by weight of the long chain amino acid.

Other suitable long chain amide-forming monomers which may be utilized to form the stabilizing polyamide resin of component (c) are the dimeric fatty acids and amines, or amide forming derivatives thereof, having 16 to 48 carbon atoms. Such acids and amines are disclosed in U.S. Pat. No. 4,018,731 and U.S. Pat. No. 3,242,141 which are incorporated herein by reference. A preferred material is the dimer diamine having 36 carbon atoms derived from oleic and linoleic acid.

Additionally suitable long chain amide-forming monomers include the polyether diamines having the formulae:

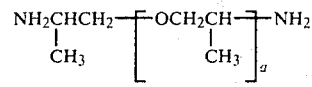

wherein a is 2.6 to 35 and

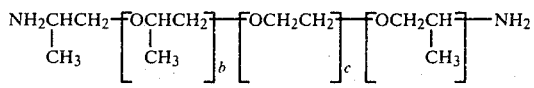

wherein c is 10 to 50 and b+d is 2 to 5. Preferred are the polyether diamines having a molecular weight of about 400 to 600.

The long chain dicarboxylic acids or diamines described above may be copolymerized with any conventional amide-forming co-reactant to form the stabilizing polyamide resin of component (c). For example, if the long chain amide-forming monomer is a dicarboxylic acid, the co-reactant may be any conventional diamine utilized to form polyamides, including the long chain diamines. Ordinarily the diamine will have a medium chain length such as hexamethylene diamine, heptamethylene diamine, etc. Conversely, if the long chain amide-forming monomer is a diamine, including the dimer diamines and polyether diamines, then any conventional dicarboxylic acid may be utilized as the co-reactant to form the stabilizing polyamide resin. Preferred are the dicarboxylic acids having 6 to 14 carbon atoms including adipic, pimelic, suberic, azelaic, sebacic, undecanedioic, dodecanedioic, etc.

It is preferred that when the long chain amide-forming monomer component is a dicarboxylic acid or diamine that the stabilizing polyamide resin of component (c) comprise a copolymer of said long chain monomer and its coreactant (as described above) with other polyamide forming monomers. Thus, it is especially preferred that the stabilizing polyamide resin comprise a copolymer of long chain diamine, dicarboxylic acid having 6 to 14 carbon atoms and either caprolactam or hexamethylene diamine/adipic acid. The long chain diamine and its co-reactant should be present in approximately equimolar amounts and should comprise about 5 to 20% by weight of the stabilizing polyamide resin.

In a most preferred embodiment, the stabilizing polyamide resin of component (c) will be a copolymer of caprolactam and amino undecanoic acid (nylon 6, 11), a copolymer of caprolactam, dimeric fatty amine (dimer diamine) having 36 carbon atoms, and dicarboxylic acid having 6 to 14 carbon atoms, or a copolymer of caprolactam, polyether diamine having a molecular weight of 400 to 600, and dicarboxylic acid having 6 to 14 carbon atoms.

The stabilizing polyamide resin of component (c) should comprise 5 to 30%, preferably 10 to 20%, by weight of the composition of the present invention.

The polyamide composition of the present invention may be prepared by any technique which will provide a substantially homogeneous blend of components (a), (b) and (c) as previously defined. For example, components (a), (b) and (c) may be mechanically mixed together in pellet, flake or powder form using conventional methods followed by mechanical mastication, generally at a temperature in excess of the melting or softening point of the mixture but below the degradation temperature of the composition. The mechanical mastication may generally be carried out in an extruder, mixer (e.g. Banbury), plasticator, open roll mill, etc. Temperatures between 400° and 600° F., and particularly between 425° and 575° F., are suitably employed.

The present composition may also be prepared by conventional graft copolymerization techniques wherein the corresponding monomeric precursors of components (a) and/or (c) are polymerized in the presence of component (b) and component (a) or (c) if not accounted for in monomeric form. In addition, either of the monomeric precursors of (a) or (c) may be first graft polymerized with component (b), then subsequently blended with the remaining component.

The following examples are illustrative of the invention. Parts and percentages are by weight unless otherwise indicated.

EXAMPLE 1

A pellet tumble blend of the following components:
69.75 parts polycaprolactam (relative viscosity about 5.0 measured as 1% solution in sulfuric acid at 25° C.)
5 parts ethylene/ethyl acrylate copolymer containing 18% ethyl acrylate (Union Carbide DPDA-9169)
10 parts ionomer of ethylene/methacrylic acid copolymer (Dupont Surlyn ® 1856)
0.25 parts lubricant
15 parts copolymer of caprolactam (85%) and amino-undecanoic acid (15%) having a relative viscosity of about 3.4 (1% solution in m-cresol at 25° C.)
were charged to a 1.75 inch, 20/1 L/D, Essex extruder and extruded at a temperature profile of 450° F. (rear), 525° F. (mid), 525° F. (front) and 525° F. (die) through a 20-60-150 mesh screenpack. The substantially homogeneous composition was water quenched, pelletized and externally lubricated.

EXAMPLE 2

The procedure of Example 1 was repeated except that instead of the amino-undecanoic acid copolymer, there was substituted 15 parts of a copolymer of caprolactam (90%), dimer diamine having 36 carbon atoms (Henkel Versamine ® 522-7.4%) and azelaic acid (2.6%) having a relative viscosity of about 3.6 (1% solution in m-cresol at 25° C.).

EXAMPLE 3

The procedure of Example 1 was repeated except that instead of the amino-undecanoic acid copolymer, there was substituted 15 parts of a copolymer of caprolactam (90%), polyoxypropylene diamine having a molecular weight of about 400 (Jefferson Chemical Jeffamine ® D-400-7.4%), and adipic acid (2.6%) having a relative viscosity of about 3.6 (1% solution in m-cresol at 25° C.).

The compositions prepared in Examples 1 to 3 were molded into one-eighth inch test bars and tested in accordance with ASTM D-256 for Izod impact strength. No break occurred using both a two pound and an eight pound hammer. Scale readings indicated an impact strength in excess of 20 foot pounds per inch of notch for all three compositions.

What is claimed is:

1. A polyamide composition comprising:
  (a) at least 50% of a polyamide resin having a relative viscosity of at least 4.0 measured as a 1% solution in sulfuric acid at 25° C. and having four to eight carbon atoms separating the amide groups thereof;
  (b) about 5 to 30% of an impact modifier selected from the group consisting of:
    (i) an olefin-acid copolymer comprising at least 50 mole percent based on the copolymer of an α-alkene having 2 to 10 carbon atoms, or mixtures of such α-alkenes, and 0.2 to 25 mole percent based on the copolymer of an α,β-ethylenically unsaturated carboxylic acid having 3 to 8 carbon atoms, mixtures of such acids, or the salts, esters or anhydrides thereof;
    (ii) ionomers of the olefin-acid copolymers defined in (i) wherein at least 10% of the carboxylic acid groups are neutralized with metal ions; and
    (iii) mixtures of (i) and (ii); and
  (c) about 5 to 30% of a stabilizing polyamide resin which contains at least one long-chain amide-forming monomer component having at least 9 atoms separating the amide-forming sites of said monomer.

2. The composition of claim 1 wherein the long chain amide-forming monomer component is a dicarboxylic acid, diamine, amino-acid, or amide-forming derivative thereof.

3. The composition of claim 2 wherein the long chain amide-forming monomer component is an amino-acid having 9 to 16 carbon atoms separating the amide-forming sites.

4. The composition of claim 3 wherein the stabilizing polyamide resin comprises a copolymer of said amino-acid with caprolactam.

5. The composition of claim 4 wherein the amino-acid is selected from 11-aminoundecanoic acid and 12-aminododecanoic acid.

6. The composition of claim 5 wherein the amino-acid comprises 5 to 20% of said stabilizing polyamide resin.

7. The composition of claim 2 wherein the long chain amide-forming monomer component is selected from dicarboxylic acids, diamines, and their amide-forming derivatives having 9 to 50 carbon atoms separating the amide-forming sites.

8. The composition of claim 7 wherein the long chain amide-forming monomer component is selected from dimeric fatty acids and dimeric fatty amines having 16 to 48 carbon atoms.

9. The composition of claim 8 wherein the stabilizing polyamide resin comprises a copolymer of caprolactam with dimeric fatty amine and a dicarboxylic acid having 6 to 14 carbon atoms.

10. The composition of claim 9 wherein the dimeric fatty amine has 36 carbon atoms and the dicarboxylic acid is azelaic acid.

11. The composition of claim 10 wherein the caprolactam comprises 80 to 95% of said stabilizing polyamide resin.

12. The composition of claim 2 wherein the long chain amide-forming monomer component is a polyether diamine selected from the group consisting of:

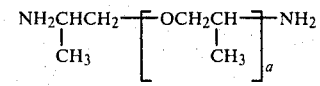

wherein a is 2.6 to 35 and

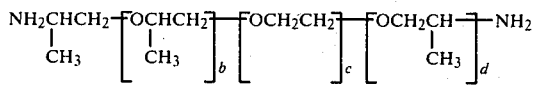

wherein c is 10 to 50 and b+d is 2 to 5.

13. The composition of claim 12 wherein the stabilizing polyether resin comprises a copolymer of caprolactam with said polyether diamine and a dicarboxylic acid having 6 to 14 carbon atoms.

14. The composition of claim 13 wherein the polyether diamine has a molecular weight of 400 to 600 and the dicarboxylic acid is adipic acid.

15. The composition of claim 14 wherein the caprolactam comprises 80 to 95% of said stabilizing polyamide resin.

16. The composition of claim 1 wherein the polyamide resin of component (a) is polycaprolactam.

17. The composition of claim 16 wherein the polycaprolactam has a relative viscosity of about 4.0 to 6.0

18. The composition of claim 17 which comprises a homogeneous blend prepared by mechanical mastication.

19. A method of preparing the composition of claim 1 which comprises extruding a uniform mixture of components (a), (b) and (c) at a temperature of 425° to 575° F.

20. The composition of claim 1 wherein the polyamide resin of component (a) is selected from polycaprolactam, polyhexamethylene adipamide, polyhexamethylene sebacamide, and copolymers or blends thereof.

21. The composition of claims 6, 11 or 15 wherein the impact modifier comprises 10 to 20% of the polyamide composition and contains an ionomer of an ethylene-methacrylic acid copolymer, and said stabilizing polyamide resin comprises 10 to 20% of said polyamide composition.

22. The composition of claim 21 wherein the impact modifier additionally comprises an ethylene-ethyl acrylate copolymer in admixture with said ionomer.

* * * * *